Patented Feb. 9, 1937

2,070,275

UNITED STATES PATENT OFFICE 2,070,275

COLORED SALTS OF ORGANIC AMMONIA DERIVATIVES AND ACID DERIVATIVES OF NITRATED ANILINES

Karl Holzach and Fritz Lange, Ludwigshafen-on-the-Rhine, Germany, assignors to I. G. Farbenindustrie Aktiengesellschaft, Frankfort-on-the-Main, Germany No Drawing. Application November 9, 1931, Serial No. 574,036. In Germany November 12, 1930

6 Claims. (Cl. 260—129)

The present invention relates to new colored salts of organic ammonia derivatives and acid derivatives of nitrated anilines suitable for preparing colored compositions.

We have found that the neutral salts of organic ammonia derivatives and anilines which may be substituted by a benzene radical on the nitrogen atom and contain a nitro and an acid group, viz. sulphonic or carboxylic acid group, in the molecule and which may be substituted by halogen, alkyl or hydroxy groups, are suitable for the manufacture and production of "colored compositions". By this latter term we intend to include artificial masses containing cellulose esters or ethers, or artificial or natural resins, for example phenol or urea formaldehyde condensation products, and solutions of such masses in organic solvents, for example resin varnishes, nitrocellulose lacquers and the like. The said salts are particularly suitable for coloring such masses and solutions thereof, since they are readily soluble in the organic solvents commonly used in the production of such masses, such as aliphatic alcohols or their esters, for example ethyl, butyl and amyl alcohol, glycol and their esters, ketones, such as acetone, methylethyl ketone, dibutyl ketone, cyclohexanone and its homologues, and mixtures of such solvents. For the solvents which may be employed for the preparation of the "colored compositions" in which the said salts are soluble reference may be had to the solvents described in "Cellulose Ester Varnishes" by Sproxton, London 1925 and "Natural and Synethetic Resins" by Barry, Drummond and Morrell, London 1926.

Suitable organic ammonia derivatives which may be used for preparing the salts, are for example alkylamines, such as mono-, di- and trimethylamine, the ethylamines and the like, arylamines and aralkylamines, for example the methyl-anilines, xylidines, pseudocumidine, also the amines containing the nitrogen atom as a member of a ring may be used, for example pyridine, piperidine, quinoline, quinaldine and the like. Particularly suitable are the hydroaromatic amines, for example cyclohexylamine and dicyclohexylamine and their homologues. Also amines having dyestuff character may be used, as for example the bases of the Rhodamine, Auramine and Methyl violet series. As a rule, the solubility of the salts in organic solvents increases in accordance with the basicity of the organic ammonia derivative they contain.

Derivatives of aniline which may be used in the form of their salts with the aforesaid organic ammonia derivatives, are aniline itself and diphenylamine containing a nitro and a sulphonic or carboxylic acid group in the molecule and which may be substituted by an alkyl group, for example a methyl, ethyl, a normal or iso-propyl or butyl group, a halogen, viz. chlorine, bromine or iodine, or a hydroxy group. Such anilines are, for example, nitraniline sulphonic acids, nitrodiphenylamine carboxylic acids, nitrodiphenylamine mono- and di-sulphonic acids and the like.

The said salts may be produced in the usual manner and then incorporated with the compositions or solutions thereof, or they may be produced within the masses or solutions thereof by simultaneously or consecutively dissolving or dispersing the acid and basic components in equivalent amounts whereby the salts are formed, the formation thereof being accelerated, if necessary, by heating.

The lacquers which are colored with the said salts yield coatings or printings characterized by strong, brilliant shades and good fastness to light on substrata of all kinds, as for example on metal or paper.

The following examples will further illustrate how the said invention may be carried out in practice but the invention is not restricted to these examples. The parts are by weight.

Example 1

5 parts of the dicyclohexylamine salt of 2-nitraniline-4-sulphonic acid are dissolved in 100 parts of a commercial nitrocellulose lacquer, and a lacquer is obtained which yields greenish yellow coatings of excellent fastness to light.

The said salt may be obtained by the conversion of equivalent amounts of the sodium salt of 2-nitraniline-4-sulphonic acid with dicyclohexylamine hydrochloride in aqueous solution.

Example 2

1.5 parts of the cyclohexylamine salt of 2,4-dinitro-diphenylamine-3'-sulphonic acid are dissolved in 100 parts of a commercial nitrocellulose lacquer. A pure yellow colored lacquer is obtained. Instead of the said salt of 2,4-dinitrodiphenylamine-3'-sulphonic acid, cyclohexylamine salts of the isomeric acids, as for example of 2,4-dinitro-diphenylamine-4'-sulphonic acid, or 2,6-dinitrodiphenylamine-4-sulphonic acid may be employed for example.

Example 3

From 2 to 3 parts of the neutral dicyclohexylamine salt of 2,6-dinitrodiphenylamine-4,3'-disulphonic acid are dissolved in 100 parts of a lacquer of ethyl alcohol and Manila copal. The lacquer thus colored yields brilliant golden yellow coatings of excellent fastness to light. The said salt may be obtained for example by converting the dipotassium salt of 2,6-dinitrodiphenylamine-4,3'-disulphonic acid in aqueous solution with a hydrochloric acid solution of the equivalent amount of dicyclohexylamine.

Instead of the dicyclohexylamine salt, organic salts of other dinitrodiphenylaminedisulphonic acids, as for example the piperidine salt of 2,4-dinitrodiphenylamine-6,4'-disulphonic acid, the cyclohexylamine salt of 2,6-dinitro-4'-chlordiphenylamine-4,3'-disulphonic acid, the dicyclohexylamine salt of 2,6-dinitrodiphenylamine-4,4'-disulphonic acid or of 2,6-dinitro-4'-chlordiphenylamine-4,3' disulphonic acid may be employed in the said lacquer.

Example 4

3.2 parts of free 2,4-dinitrodiphenylamine-3'-carboxylic acid are triturated with 100 parts of nitrocellulose lacquer and then brought into solution by the addition of 2 parts of dicyclohexylamine. A clear yellow lacquer is obtained.

Example 5

3 parts of the salt prepared from 44 parts of Rhodamine B (Schultz, Farbstofftabellen, 7th edition, No. 864) and 36 parts of 2,4-dinitrodiphenylamine-3'-sulphonic acid sodium salt in aqueous solution are dissolved in 100 parts of a commercial nitrocellulose lacquer or of a lacquer prepared from ethyl alcohol and Manila copal. Brilliant scarlet red coatings are produced with the lacquer thus obtained, which have an essentially increased fastness against light as compared with those obtained with a lacquer colored with the said dyestuff itself, while the shade is only slightly changed to yellow.

Example 6

100 parts of celluloid moistened with ethyl alcohol to form a plastic mass are thoroughly incorporated with 1,5 parts of the neutral cyclohexylamine salt of 2,6-dinitro-4'-chlordiphenylamine-4,3'-disulphonic acid in a kneading apparatus. A plastic mass having a completely homogeneous yellow color is obtained which may be further worked up in the usual manner.

Example 7

4 parts of the cyclohexylamine salt of 2-nitro-5-chloraniline-4-sulphonic acid are dissolved in 100 parts of a commercial nitrocellulose lacquer. The lacquer yields greenish yellow coatings.

Example 8

From 3 to 4 parts of the neutral dicyclohexylamine salt of 2,6-dinitro-4'-hydroxy-3'-carboxydiphenylamine-4,5'-disulphonic acid are dissolved in 100 parts of a commercial nitrocellulose lacquer, and a lacquer is obtained yielding brilliant light brown coatings.

Example 9

5 parts of the salt prepared from 63 parts of Methyl violet B extra (Schultz Farbstofftabellen, 7th edition, No. 783) and 26 parts of the ammonium salt of ortho-nitraniline-para-sulphonic acid in aqueous solution, are dissolved in 1000 parts of a commercial nitrocellulose lacquer. Dark violet coatings are obtained with the resulting colored lacquer.

Example 10

4 parts of the salt prepared from 61 parts of Rhoduline blue 6 G (Schultz Farbstofftabellen, 7th edition No. 755) and 40 parts of 2,4-dinitrodiphenylamine-3'-sulphonic acid sodium salt in aqueous solution, are dissolved in 1000 parts of a commercial spirit lacquer. Blue green coatings are obtained with the resulting colored lacquer.

What we claim is:

1. Neutral salts suitable for the production of colored compositions, said salts being formed by reacting a component selected from the group consisting of the primary, secondary and tertiary organic ammonia derivatives with an aniline which may be substituted on the nitrogen atom by a benzene radical and may contain a nuclear substituent selected from the group consisting of halogen, alkyl, and hydroxy groups, said aniline containing in the molecule a nitro group and a sulphonic acid group.

2. Neutral salts suitable for the production of colored compositions, said salts being formed by reacting a cyclohexylamine with an aniline which may be substituted on the nitrogen atom by a benzene radical and may contain a nuclear substituent selected from the group consisting of halogen, alkyl, and hydroxy groups, said aniline containing in the molecule a nitro group and a sulphonic acid group.

3. Neutral salts suitable for the production of colored compositions, said salts being formed by reacting a dicyclohexylamine with an aniline which may be substituted on the nitrogen atom by a benzene radical and may contain a nuclear substitutent selected from the group consisting of halogen, alkyl and hydroxy groups, said aniline containing in the molecule a nitro group and a sulfonic acid group.

4. The salt suitable for the production of colored compositions, said salt being formed by reacting dicyclohexylamine with 2-nitraniline-4-sulphonic acid.

5. The neutral salt suitable for the production of colored compositions, said salt being formed by reacting dicyclohexylamine with 2,6-dinitrodiphenylamine-4,3'-disulphonic acid.

6. The neutral salt suitable for the production of colored compositions, said salt being formed by reacting dicyclohexylamine with 2,6-dinitro-4'-chlordiphenylamine - 4,3' - disulphonic acid.

KARL HOLZACH.
FRITZ LANGE.